US006773496B2

(12) United States Patent
Doyle et al.

(10) Patent No.: US 6,773,496 B2
(45) Date of Patent: Aug. 10, 2004

(54) PHASE CHANGE INK COMPOSITION

(75) Inventors: Joseph Doyle, Limerick (IE); Patrick Meagher, Nenagh (IE); Patrick Joseph Ryan, Clonoulty (IE); Francois Colrat, Rodez (FR); Annaik Genson, Moules et Baucels (FR); Stuart Hampshire, Limerick (IE); Caroline O'Sullivan, Skibbereen (IE)

(73) Assignee: Carey Brothers Limited, Nenagh (IE)

( * ) Notice: Subject to any disclaimer, the term of this patent is extended or adjusted under 35 U.S.C. 154(b) by 0 days.

(21) Appl. No.: 10/045,679

(22) Filed: Jan. 15, 2002

(65) Prior Publication Data
US 2002/0144627 A1 Oct. 10, 2002

(30) Foreign Application Priority Data

Jan. 16, 2001 (EP) .............................................. 01650006

(51) Int. Cl.[7] .............................................. C09D 11/00
(52) U.S. Cl. ................ 106/31.61; 106/31.65; 106/31.67; 106/31.86
(58) Field of Search ............................ 106/31.61, 31.65, 106/31.67, 31.86; 501/14, 17, 18, 20

(56) References Cited

U.S. PATENT DOCUMENTS

| | | | | |
|---|---|---|---|---|
| 4,070,517 A | * | 1/1978 | Kazmierowicz ............ 428/209 |
| 4,264,679 A | * | 4/1981 | Panzarino et al. .......... 428/427 |
| 4,390,565 A | | 6/1983 | Fonda ......................... 427/44 |
| 4,401,767 A | * | 8/1983 | Dietz et al. ................... 501/19 |
| 4,446,241 A | * | 5/1984 | Francel et al. ................ 501/14 |
| 4,472,537 A | | 9/1984 | Johnson et al. ............. 523/160 |
| 4,717,690 A | * | 1/1988 | Hankey et al. ................ 501/20 |
| 4,732,794 A | * | 3/1988 | Hyde .......................... 428/210 |
| 5,185,035 A | * | 2/1993 | Brown et al. ............. 106/31.29 |
| 5,212,212 A | | 5/1993 | Fonda .......................... 522/79 |
| 5,221,335 A | | 6/1993 | Williams et al. .............. 106/23 |
| 5,252,522 A | * | 10/1993 | Dorbath et al. ............... 501/19 |
| 5,286,288 A | * | 2/1994 | Tobias et al. ............. 106/31.29 |
| 5,397,388 A | * | 3/1995 | Fujioka ................... 106/31.29 |
| 5,405,438 A | | 4/1995 | Fujioka ........................ 106/27 |
| 5,538,550 A | * | 7/1996 | Yaegashi et al. ......... 106/31.29 |
| 5,747,395 A | * | 5/1998 | Smith et al. .................... 501/5 |
| 6,068,692 A | | 5/2000 | Zimmer ....................... 106/426 |
| 6,171,383 B1 | * | 1/2001 | Sakoske et al. ............. 106/479 |
| 6,221,147 B1 | * | 4/2001 | Sakoske et al. ............. 106/479 |
| 6,248,680 B1 | * | 6/2001 | Xue et al. ...................... 501/15 |

FOREIGN PATENT DOCUMENTS

| | | |
|---|---|---|
| EP | 0105994 A1 | 4/1984 |
| EP | 0181198 A2 | 5/1986 |
| GB | 2274847 A | 8/1994 |

* cited by examiner

*Primary Examiner*—Mark L. Bell
*Assistant Examiner*—Veronica F. Faison
(74) *Attorney, Agent, or Firm*—Jacobson Holman PLLC

(57) ABSTRACT

An ink suitable for application to a heat resistant substrate and firing to fuse the ink to the substrate, the ink being in a form for ink jet printing and including a carrier material; a pigment; a fusible vitreous agent including particles of less than 10 microns in size, and the carrier having a melting point for phase change of the ink. The pigment includes ceramic pigment particles of less than 10 microns in size and the pigment and fusible vitreous agent are combined in the form of ceramic pigment particles. Dispersant is chemisorbed to these particles.

29 Claims, 1 Drawing Sheet

PHASE CHANGE INK COMPOSITION

INTRODUCTION

1. Field of the Invention

Figure 1:
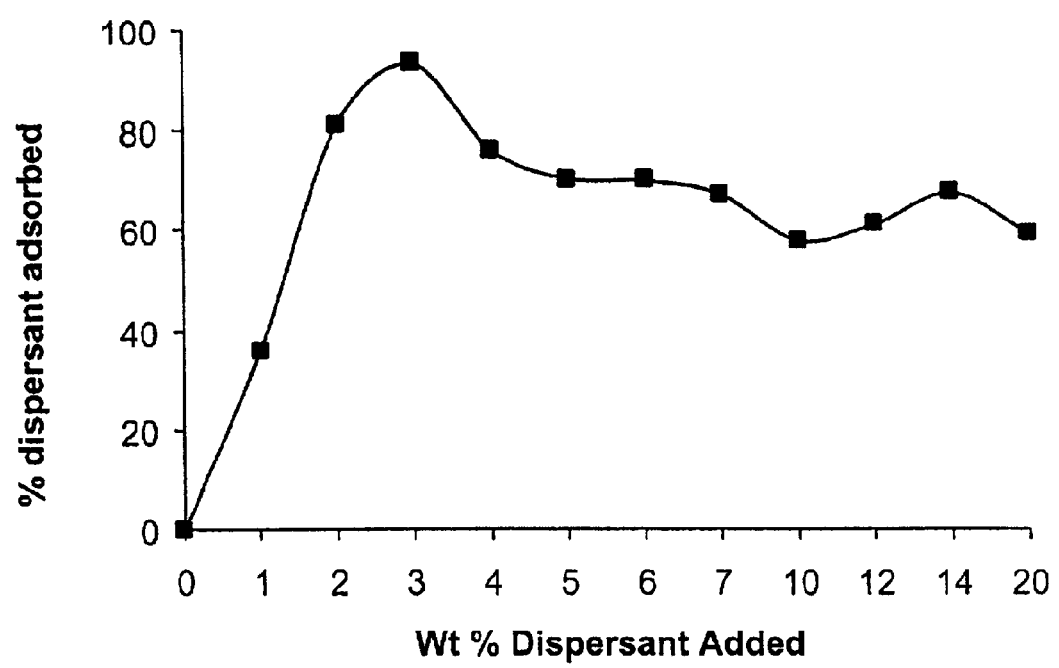

The invention relates to inks for application to a heat resistant substrate such as glass, metal, or ceramic and subsequently firing to fuse the ink to the substrate.

2. Prior Art Discussion

U.S. Pat. No. 4,390,565 and U.S. Pat. No. 5,212,212 describe inks based on a UV curable ink system and are designed to be applied by a screen printing process. The ceramic ink formulations described are in liquid form and the solid constituents of the inks tend to sediment as a function of time in storage. Therefore the ink must be constantly mixed while not in use. This also applies to other types of liquid ink such as solvent or oil based ink.

EP0105994 (Corning Glass) describes a thermoplastic hot melt ink, the viscosity of which has a tacky paste consistency for application by elastomeric transfer printing to a substrate.

While such inks may adhere well to substrates such as ceramics, the printing methods involved suffer from the following disadvantages:

need for storage of screens or transfer members, high cost for low volume printing and lack of versatility generally, limitations in substrate surface printing coverage, in which edge-to-edge printing is often not possible, and requirement for an even substrate surface.

The invention is therefore directed towards providing an ink for application to a heat resistant substrate to overcome at least some of the above problems.

SUMMARY OF THE INVENTION

According to the invention there is provided an ink suitable for application to a heat resistant substrate and firing to fuse the ink to the substrate, the ink being in a form for ink jet printing and comprising:

a carrier material;

a pigment;

a fusible vitreous agent comprising particles of less than 10 microns in size, and the carrier having a melting point for phase change of the ink.

Preferably the pigment is in particulate form.

In one embodiment of the invention the pigment comprises ceramic pigment particles of less than 10 microns in size. Preferably the concentration of ceramic pigment in the ink is in the range of 10% to 60% by weight, preferably 20% to 50% by weight.

In another embodiment of the invention the pigment and fusible vitreous agent are combined in the form of ceramic pigment particles. Preferably the ceramic pigment particles are less than 5 microns in size.

In one embodiment of the invention the ink comprises a dispersant. Preferably the particles are coated with the dispersant.

Most preferably the dispersant is chemisorbed onto the particles.

The dispersant may be chemisorbed onto the particles by drying in an oven for up to 24 hours wherein the temperature of the oven is at least 120° C.

Preferably the dispersant is selected from a modified polyacrylate and fatty acid, most preferably the dispersant is selected from 12-hydroxystearic acid, stearic acid, tartaric acid, hydroxybenzoic acid and docosanoic acid. Ideally the dispersant comprises stearic acid.

In one embodiment of the invention the dispersant is present in a concentration by weight of the ceramic pigment from 2 to 5%, preferably approximately 4%.

Preferably the particles are coated with a dispersant in the presence of a solvent. Most preferably the dispersant is soluble in the solvent. The solvent may be toluene or butyl acetate.

The particles may be coated with a dispersant by ball milling or using a rotary dissolver.

Preferably the carrier material comprises a wax material. Most preferably the carrier material has a melting point of from 20 to 150° C., preferably 50 to 100° C.

In one embodiment of the invention, the pigment comprises a chemical dye.

In another embodiment of the invention the pigment comprises organometallic particles and metallic components.

The invention provides an ink suitable for application to a heat resistant substrate and firing to fuse the ink to the substrate, the ink being in a form for ink jet printing and comprising;

ceramic pigment particles of less than 10 microns in size;

fusible vitreous particles of less than 10 microns in size; and a carrier having a melting point for phase change of the ink.

Preferably the particles are coated with a dispersant.

The invention also provides an ink suitable for application to a heat resistant substrate and firing to fuse the ink to the substrate, the ink being in a form for ink jet printing and comprising;

a carrier having a melting point for phase change of the ink;

ceramic pigment particles of less than 10 microns in size;

fusible vitreous particles of less then 10 microns in size; and a dispersant which is chemisorbed onto the particles.

The invention further provides a method of producing an ink in a form for ink jet printing comprising the steps of:

milling a fusible vitreous agent to provide a powder having a particle size less than 10 $\mu$m;

providing a pigment for the ink;

heating a phase change carrier, and mixing the powder with the molten carrier; and allowing the carrier to cool to provide solid ink.

Preferably the pigment is combined with the fusible vitreous agent as ceramic pigment particles.

The invention also provides a method of producing an ink comprising the steps of:

milling a fusible vitreous agent to provide a powder having a particle size less than 10 $\mu$m;

providing a pigment for the ink;

mixing the milled particles with a dispersant, and a solvent;

removing the solvent;

heating the mixture to a temperature in excess of 120° C. whereby the dispersant is chemisorbed onto the milled particles;

heating a phase change carrier, and mixing the powder mixture with the molten carrier; and allowing the carrier to cool to provide solid ink.

Preferably the pigment is combined with the fusible vitreous agent as ceramic pigment particles.

DETAILED DESCRIPTION OF THE INVENTION

The invention will be more clearly understood from the following description of some embodiments thereof, given by way of example only with reference to FIG. 1 which is a graph showing dispersant adsorption.

The invention provides an improved phase change ink suitable for application to heat resistant substrates by ink jet printing.

The advantages of using an inkjet printing method over a screen printing method or elastomeric transfer printing include the following; 1). Images and patterns are produced and stored digitally, and therefore there is no requirement for storage of a large number of printing screens; 2) it is equally feasible to print images in small numbers as it is to print in large numbers; 3) the printer can change from printing one image to printing another without shutting down; 4) each image printed can be different from the previous one; 5) edge to edge printing is possible; 6) any size of image is possible; 7) process colours are possible; 8) it is possible to print onto uneven surfaces; 9) it is possible to print onto three dimensional shapes e.g. table ware and ornamental ware; 10) it offers greater flexibility in terms of the types of images that can be printed as well as the types of substrates that can be printed onto; 11) a smaller number of ink colours are required.

The ink of the invention in a form for ink jet printing comprises the following:

(a) a carrier material, preferably a wax having a melting point of from 20 to 150° C., preferably from 50 to 100° C., suitable for solid/liquid phase change of the ink, (b) pigment particles of less than 10 microns in size;

(c) fusible vitreous particles of less than 10 microns in size; and (d) a dispersant.

The ink is a phase change ink. In other words the ink remains in a solid form while in storage and when the temperature of the printer is lower than the melting point of the ink carrier material, for example when the printer is switched off. When the printer is operating the ink is heated to a temperature which is higher than the melting point of the carrier material, the carrier material melts, and the ink becomes liquid. In this way no sedimentation of the ceramic particles occurs while the ink is in storage thus effectively and significantly increasing the shelf life of the ink. The ink can be inkjet printed onto ceramic, glass, metal and other heat-resistant materials. The print is subsequently fired to remove the organic constituents of the ink and to fuse the pigment constituents to the substrate.

The carrier material is a wax material such as paraffin wax, an example of which is, Paraflint C77®, produced by Schuman Sasol GmbH, Hamburg, Germany. However, any other suitable wax or wax-like material such as, but not limited to, those outlined in Table 1 below may be used (mp=melting point).

TABLE 1

| Animal | Vegetable | Mineral | Synthetic |
|---|---|---|---|
| Beeswax (mp 62–65° C.) | Candelillia (mp 68.5–72.5° C.) | Montan (mp 83–93° C.) | Fischer-Tropsch waxes eg. paraflint (mp 44–75° C.) |
| Bayberry (mp 38–49° C.) | Carnauba (mp 83–86° C.) Japan wax (mp 50° C.) | | Polyethylene (mp 90–120° C.) Fatty acids e.g. stearic acid (mp 69° C.), hydroxystearic acid (mp 75° C.) |

The pigment may be any material capable of providing a colour. Preferably the pigment is a ceramic pigment material.

The term "ceramic" means the inorganic constituents of the ink. These may include crystalline or amorphous (glass) inorganic materials. The ceramic constituents form the pigment in the ink and not only produce the colour in the ink but also fuse to the substrate during the firing process. The ceramic may be one or more discrete materials, however, they are referred to collectively as the "ceramic pigment".

The ceramic pigment may comprise one or more metal oxides, which have characteristic crystalline structures, which impart colour to materials.

Preferably the ceramic pigment material is a powdered pigmented vitreous material comprising a combination of a ceramic pigment and a fusible vitreous agent.

The pigment may be an organometallic material, wherein on firing, the organic constituent burns off and the metallic constituents oxidise to form a metal oxide. Alternatively, the colour may be produced by using compounds which contain metallic elements and are soluble in the carrier material. On firing, the metallic elements oxidise to form coloured metal oxides. The resultant inks may be of any colour, but will preferably be black, cyan, magenta, yellow, or white or variations of these.

The vitreous agent provides the means for fusing the pigment material to the substrate during firing at temperatures in the range of approximately 700 to 1300° C. The fusible vitreous agent may be a lead-boro-silicate glass material or any other suitable glass material. The pigment and fusible vitreous agent are preferably combined/incorporated in the form of ceramic pigment particles.

The dispersant assists in stabilising the dispersion of the pigment particles in the ink by creating repulsive forces between the particles, thereby inhibiting agglomeration or flocculation in the ink. The proportion of dispersant added to the ink composition is in the range of from 0.5–20% of the weight of the ceramic powder. However, the amount of dispersant added is preferably from 2 to 5% of the weight of the ceramic powder. Preferably the dispersant is a modified polyacrylate, such as EFKA 4401®, produced by EFKA Additives B.V., Netherlands. Alternatively the dispersant is a fatty acid material such as 12-hydroxystearic acid or stearic acid, or any other suitable dispersant.

The ceramic pigment of the invention is in the form of a very fine powder with a particle size less than 10 $\mu$m, most preferably less than 5 $\mu$m in size. The viscosity of the ink is in the range of from 10 to 40 cP, and preferably from 10 to 25 cP.

The powdered materials with the desired particle size distribution may be produced by milling, sol-gel, or any other suitable powder production method. Preferably the desired particle size distribution is obtained by bead milling commercially available pigments in the presence of a liquid. A quantity of the commercially available ceramic pigment powder is placed into a ceramic vessel with a quantity of ceramic beads. To this water is added and the contents are stirred at high speed with a ceramic stirrer. At different time intervals samples of the powder/water mixture (slurry) are extracted and the particle size distribution is determined by a laser diffraction technique. After milling is complete the liquid is removed by filtration, evaporation or any other suitable method and the milled powder is dried thoroughly in an oven.

The pre-milled pigment(s), with the desired particle size distribution, are prepared for dispersion in a carrier material by coating the particles with the dispersant. The powder (milled pigment) is mixed with a suitable solvent and the dispersant is added to the mixture. Preferably the dispersant is soluble in the solvent. The solvent may be selected from any one or more of toluene or butyl acetate. The dispersant helps to stabilise the dispersion of the pigment particles in the ink by creating repulsive forces between the particles, thereby inhibiting agglomeration or flocculation in the ink.

The proportions of powder and solvent are approximately 5 g powder per 100 ml toluene. The proportion of dispersant added is in the range of from 0.5–20% of the weight of the ceramic powder. However, the amount of dispersant added is preferably from 2 to 5% of the weight of the ceramic powder.

The mixture is combined thoroughly by a dispersion process such as ball milling or employing a rotary dissolver, which breaks up agglomerates and floccs thereby reducing the powder to the primary particles. The process coats the particles with the dispersant. After mixing, the solvent is removed by filtration, evaporation, or any other suitable means. In this way the powder is coated with dispersant. However, the dispersant is only relatively weakly bonded (physisorbed) to the surface of the particles. In order to form a stronger bond the dispersant coated powder is dried in an oven for up to 24 hours at a temperature of 120° C. This removes any remaining toluene and forms a stronger bond (chemisorbed) between the dispersant molecules and the surface of the powder particles. After the chemisorption process the powder may be passed through a 150 $\mu$m sieve to break down large agglomerates. The powder is then ready to be dispersed in the carrier material.

In order to optimise the amount of dispersant required to coat the ceramic particles an adsorption test was conducted for each type of dispersant used. The adsorption test involves varying the amount of dispersant added to the powder and combining, as described above the dispersant and powder in the proportions as outlined in Table 2 below. The ceramic powder and dispersant contents are expressed in terms of weight percent of the total solids content. The adsorption test in this case was conducted using 12-hydroxystearic acid and WHITE 45T41 pigment powder [from Johnson Matthey plc, UK]

TABLE 2

| Sample | Toluene (ml) | Powder Wt % | Dispersant Wt % |
|--------|--------------|-------------|-----------------|
| A001 | 65 | 100 | 0 |
| A002 | 65 | 99 | 1 |
| A003 | 65 | 98 | 2 |
| A004 | 65 | 97 | 3 |
| A005 | 65 | 96 | 4 |
| A006 | 65 | 95 | 5 |
| A007 | 65 | 94 | 6 |
| A008 | 65 | 93 | 7 |
| A009 | 65 | 90 | 10 |
| A010 | 65 | 88 | 12 |
| A012 | 65 | 86 | 14 |
| A013 | 65 | 80 | 20 |

The solvent is removed by filtration and the powder is washed by more solvent to remove the excess dispersant. The dispersant-coated powder is then dried in an oven at a temperature of at least 120° C.

Samples of the dispersant-coated powders were analysed by thermogravimetric analysis to determine the amount of adsorbed dispersant on the powder in each sample. Thermogravimetric analysis involves controlled heating of a small amount of the sample in a highly sensitive balance. As the organic material, i.e. the dispersant, is burned off, the balance detects a weight loss and the temperature at which it occurs. The aim is to achieve the maximum weight loss as this represents the maximum amount of adsorbed dispersant. The thermogravimetric analysis results of the samples are presented in Table 3 below.

TABLE 3

| Sample | Weight Loss (%) | % Dispersant Adsorbed |
|--------|-----------------|------------------------|
| A001 | 0 | 0 |
| A002 | 0.38 | 36 |
| A003 | 1.62 | 81 |
| A004 | 2.79 | 93 |
| A005 | 3.04 | 76 |
| A006 | 3.51 | 70.2 |
| A007 | 4.19 | 69.83 |
| A008 | 4.7 | 67.14 |
| A009 | 5.77 | 57.7 |
| A010 | 7.32 | 61 |
| A012 | 9.46 | 67.57 |
| A013 | 11.83 | 59.15 |

By plotting the weight loss results as a percentage of the weight of the dispersant added, as shown in FIG. 1, it can be seen that the amount of adsorbed dispersant increases rapidly up to approximately 2.8% weight loss which corresponds to a powder to dispersant ratio of 97:3 by weight. The results indicate that the minimum amount of the dispersant required to coat the powder is 2%, by weight, of the total amount of ceramic pigment. Preferably, 4% dispersant is used in the production of inks in order to ensure complete coverage of the pigment particles with dispersant molecules. The ceramic pigment material may alternatively be milled in the presence of a solvent. In this case the dispersant is added during the milling step of the process. After milling the solvent is removed and the dispersant chemisorbed to the powder as described previously.

The dispersant coated pigment powder is mixed with the carrier material by first wetting the powder with a small amount of solvent (approximately 1 part of solvent to 20 parts of pigment by weight) in a heating vessel with accurate temperature control. The carrier material is then added and the mixture is heated, to approximately 110° C. At this temperature the carrier material melts and the solvent is removed. The dispersant coated pigment particles are dispersed in the molten carrier material by any suitable dispersion technique such as a rotary dissolver or a three roll mill. The mixture may be maintained inside a partial vacuum during mixing in order to minimise the amount of dissolved air in the ink. After mixing, the mixture is allowed to cool so that it solidifies. The solidified material is ready for use as an ink.

The properties of the ink composition of the invention are suitable for printing using a piezoelectric drop-on-demand inkjet printer. The viscosity is in the range of from 10 to 40 cP, and preferably from 10 to 25 cP. The printing process or printer may comprise any of the following features: an ink reservoir with suitable heating capability which can be employed to melt the ink as required. An ink umbilical which may be heated in order to transport the ink from the reservoir to the printhead without allowing the ink to solidify; a piezoelectric drop-on-demand inkjet printhead with inbuilt heating capability which can maintain the ink in liquid form during printing. The heating capability of the printhead may control the temperature of the ink so as to optimise the viscosity of the ink.

Other additives to the ink composition may include binders, plasticisers, dyes, biocides, antioxidants, viscosity modifiers, defoamers or any other additives as appropriate. These ingredients may be added at the milling stage or at the dispersion stage of the production process, as appropriate.

The ink may be printed onto a variety of substrates including glass, ceramic and metal substrates. An advantage of phase change inks is that the ink droplets solidify the instant they strike the substrate. This makes substrate handling more convenient. After printing the printed ink and substrate may by fired typically at temperatures of from 700°

C. to 1300° C., preferably glass articles will be fired at a temperature of from 700° C. to 800° C. and ceramic articles will be fired at temperatures of from 900° C. to 1200° C., in order to remove the carrier material and other organic ingredients and to fuse the vitreous ceramic material, from the ink, to the substrate. The ink composition of the invention has many industrial applications. The ink may be used for decorating ceramic tiles, decorating glass articles, decorating ceramic and glass tableware, decorating ceramic and glass ornamental ware, temperature resistant marking and labelling, and decorating metal articles.

The invention will be more fully understood from the following examples.

EXAMPLE 1

Milling Process 50 g of white ceramic pigment powder (Johnson Matthey plc., UK (product code WHITE 45T41)), was placed in a ceramic pot with 400 ml of water and 600 g of ceramic beads. The contents were stirred with a ceramic stirrer at a speed of 1000 r.p.m. The results of the particle size analysis of samples of powder after milling for 1, 3, 5 and 7 hours, under these conditions, are presented in Table 4 below.

TABLE 4

| Milling time | Max. particle size ($\mu$m) | Min. particle size ($\mu$m) |
|---|---|---|
| Before milling | 50 | 0.2 |
| 1 Hour | 45 | 0.2 |
| 3.5 Hours | 20 | 0.15 |
| 5 Hours | 2.5 | 0.15 |
| 7 Hours | 1.5 | 0.1 |

The milled powder is dried by freeze-drying. This helps to minimise the amount of agglomeration. The powder is then placed in an oven at 100° C. to complete the drying process.

The results of the particle size analysis are confirmed by scanning electron microscopy.

EXAMPLE 2

Dispersant Addition and Dispersion Process 3 g of milled ceramic pigment powder was placed in a container. 50 g of ceramic pellets, 65 ml of toluene solvent and 0.12 g of 12-hydroxystearic acid (dispersant) were added and the container was sealed. The contents were ball milled for 24 hours. The resultant slurry was removed from the container and the solvent extracted by filtration, leaving dispersant coated powder. The powder was dried in an oven at 120° C. for 24 hours, to allow chemisorbtion of the dispersant onto the powder particles.

The dispersant coated powder and a solid wax, in the form of beads, were placed in a dispersion vessel. 20 ml of toluene was added to wet the powder and the mixture was stirred. The mixture was heated to 80° C. to melt the wax. The resultant liquid mixture was then dispersed using a rotary dissolver and the temperature was raised to 110° C. to evaporate the toluene. The dispersion was continued for 1 hour. The ink was then cooled until it solidified.

In Example 1 and 2 the vitreous agent and the pigment are combined or incorporated in the ceramic pigment particles. However the pigment may alternatively be provided as a chemical dye. In the latter case the vitreous agent particles are milled as described above for the ceramic pigment particles, and the dye is dissolved in a solvent and mixed with liquid wax before addition to the milled vitreous agent particles.

Dispersion Stability 5 ml samples of each phase change ink were placed in 5 ml graduated cylinders. Stoppers were placed on the cylinders to avoid evaporation. The cylinders were placed in an oven at 120° C.

The cylinders were then allowed to stand at 120° C. for 72 hours. The sedimentation volume was recorded at times of 1, 2, 4, 8, 12, 24, 48 and 72 hours.

Table 5 shows the sedimentation results, at 120° C., obtained for inks containing ceramic pigment (20% by weight), hydroxystearic acid (0.8% by weight) as the dispersant and hydroxystearic acid (79.2% by weight) as the wax carrier.

TABLE 5

| Time (hrs) | Sedimentation Volume (ml) |
|---|---|
| 1 | 0 |
| 2 | 0 |
| 4 | 0 |
| 8 | 0 |
| 12 | 0 |
| 24 | 0.1 |
| 48 | 0.3 |
| 72 | 0.5 |

EXAMPLE 3

Single Step Milling and Dispersant Addition 2 liters of solvent, 100 g of unmilled ceramic pigment and 4 g of dispersant were placed in the milling chamber of an enclosed, recirculating bead mill. The contents were milled for 5 hours. The slurry was then removed from the mill and the solvent extracted by evaporation, yielding the milled dispersant-coated powder. The dispersant was chemisorbed and the powder dispersed in the wax carrier material as described in Example 2. The advantage of this method is that the milling and dispersant addition are completed in a single step process, thereby simplifying the overall process.

Ink formulations with varying pigment loading, as outlined in Table 6, were produced by the methods described in Examples 2 and 3.

Table 6

| Sample | Wax Wt % | Ceramic Pigment Wt % |
|---|---|---|
| P1001 | 90 | 10 |
| P1002 | 80 | 20 |
| P1003 | 70 | 30 |
| P1004 | 60 | 40 |
| P1005 | 50 | 50 |
| P1006 | 40 | 60 |

EXAMPLE 4

Printing and Firing of Phase Change Ink

An ink was produced as described in Example 3 comprising 70% by weight stearic acid as a carrier, 28.8% by weight WHITE 45T41 ceramic pigment and 1.2% by weight EFKA 4401® dispersant. The ink was heated to 120° C. in a piezoelectric drop-on-demand inkjet printhead and printed in straight lines 1 cm wide, via the printhead, onto a flat glass substrate. The substrate with print applied were then passed through a kiln and fired at a temperature of 745° C., which burned off the organic materials and fused the inorganic (ceramic) materials to the glass substrate. This yielded a white enamel print of white lines on a glass substrate. It was found that the print was fused completely and was highly scratch resistant.

While the example describes printing onto a flat glass substrate the substrate may be of any desired shape.

Examples of possible combinations of ingredient that may be used to produce inks, as described above, are presented in Table 7.

TABLE 7

| Ink Formulation | Ceramic Powder | Dispersant | Solvent | Wax |
|---|---|---|---|---|
| 1 | WHITE 45T41 | 12-Hydroxystearic acid | Toluene | 12-Hydroxystearic acid |
| 2 | WHITE 45T41 | Stearic acid | Toluene | Paraffin |
| 3 | WHITE 45T41 | EFKA 4401 | Butyl acetate | Stearic acid |
| 4 | WHITE 45T41 | Tartaric acid | Toluene | Paraffin |
| 5 | WHITE 45T41 | Hydroxybenzoic acid | Toluene | Paraffin |
| 6 | WHITE 45T41 | Docosanoic acid | Toluene | Paraffin |

Viscosity

The viscosity of the ink was determined by cone and plate rotational viscometry employing a Haake RV-1 rotational viscometer with temperature control attachments.

The test involves placing the sample between a cone and a plate of standard geometry. The cone is rotated at a preset speed. The torque required to maintain the rotational speed is related to the viscosity. The viscosity is calculated from the torque required. The set speed and the geometry factors, shear force and shear rate are also calculated.

The viscosity and shear force were determined for each sample at varying shear rate.

As an example the viscosity ($\eta$ (cP) @120° C., 3000s$^{-1}$) obtained by varying the ceramic content in inks using EFKA 4401 as the dispersant (4% by weight) and stearic acid as the wax carrier are presented in Table 8.

TABLE 8

| % Dispersant Ceramic Powder | % Wax | Viscosity |
|---|---|---|
| 10 | 90 | 4 |
| 20 | 80 | 5 |
| 30 | 70 | 12 |
| 40 | 60 | 15 |
| 50 | 50 | 23 |

The invention is not limited to the embodiments described but may be varied in construction and detail.

What is claimed is:

1. An ink suitable for application to a heat resistant substrate and firing to fuse the ink to the substrate, the ink being in a form for ink jet printing and comprising:
    a carrier material;
    a pigment comprising ceramic pigment particles of less than 10 microns in size;
    a fusible vitreous agent comprising particles of less than 10 microns in size, and
    the carrier having a melting point for phase change of the ink.

2. The ink as claimed in claim 1 wherein the concentration of ceramic pigment in the ink is in the range of 10% to 60% by weight.

3. The ink as claimed in claim 1 wherein the concentration of ceramic pigment in the ink is in the range of 20% to 50% by weight.

4. The ink as claimed in claim 1 wherein the pigment and fusible vitreous agent are combined in the form of ceramic pigment particles.

5. The ink as claimed in claim 1 wherein the particles are less than 5 microns in size.

6. The ink as claimed in claim 1 wherein the ink comprises a dispersant.

7. The ink as claimed in claim 6 wherein the particles are coated with the dispersant.

8. The ink as claimed in claim 6 wherein the dispersant is chemisorbed onto the particles.

9. The ink as claimed in claim 8 wherein the dispersant is chemisorbed onto the particles by drying in an oven for up to 24 hours.

10. The ink as claimed in claim 9 wherein the temperature of the oven is at least 120° C.

11. The ink as claimed in claim 6 wherein the dispersant is selected from a modified polyacrylate and fatty acid.

12. The ink as claimed in claim 6 wherein the dispersant is selected from 12-hydroxystearic acid, stearic acid, tartaric acid, hydroxybenzoic acid and docosanoic acid.

13. The ink as claimed in claim 6 wherein the dispersant comprises stearic acid.

14. The ink as claimed in claim 6 wherein the dispersant is present in a concentration by weight of the ceramic pigment from 2 to 5%.

15. The ink as claimed in claim 6 wherein the dispersant is present in a concentration by weight of the ceramic pigment of approximately 4%.

16. The ink as claimed in claim 6 wherein the particles are coated with a dispersant in the presence of a solvent.

17. The ink as claimed in claim 16 wherein the dispersant is soluble in the solvent.

18. The ink as claimed in claim 17 wherein the solvent is toluene or butyl acetate.

19. The ink as claimed in claim 6 wherein the particles are coated with a dispersant by ball milling or using a rotary dissolver.

20. The ink as claimed in claim 1 wherein the carrier comprises a wax material.

21. The ink as claimed in claim 20 wherein the carrier has a melting point of from 20 to 150° C.

22. The ink as claimed in claim 1 wherein the pigment comprises organometallic particles and metallic components.

23. An ink suitable for application to a heat resistant substrate and firing to fuse the ink to the substrate, the ink being in a form for ink jet printing and comprising:
    a carrier having a melting point for phase change of the ink;
    ceramic pigment particles of less than 10 microns in size;
    fusible vitreous particles of less than 10 microns in size; and
    a dispersant which is chemisorbed onto the particles.

24. A method of producing an ink in a form for ink jet printing comprising the steps of:
    milling a fusible vitreous agent to provide a powder having a particle size less than 10 mm;
    providing a pigment for the ink;
    heating a phase change carrier, and mixing the powder with the molten carrier; and
    allowing the carrier to cool to provide solid ink.

25. The method as claimed in claim 24, in which the pigment is combined with the fusible vitreous agent as ceramic pigment particles.

26. A method of producing an ink comprising the steps of:
    milling a fusible vitreous agent to provide a powder having a particle size less than 10 mm;

providing a pigment for the ink;

mixing the milled particles with a dispersant, and a solvent;

removing the solvent;

heating the mixture to a temperature in excess of 120° C. whereby the dispersant is chemisorbed onto the milled particles;

heating a phase change carrier, and mixing the powder mixture with the molten carrier; and allowing the carrier to cool to provide solid ink.

27. The method as claimed in claim 26 wherein the pigment is combined with the fusible vitreous agent as ceramic pigment particles.

28. An ink suitable for application to a heat resistant substrate and firing to fuse the ink to the substrate, the ink being in a form for ink jet printing and comprising:

a carrier material;

a pigment;

a fusible vitreous agent comprising particles of less than 10 microns in size, and the carrier having a melting point for phase change of the ink;

the particles being coated with a dispersant in the presence of a solvent, the dispersant being soluble in the solvent, and said solvent comprises one of toluene and butyl acetate.

29. The ink as claimed in claim 21, wherein the carrier has a melting point of from 50 to 100° C.

* * * * *